United States Patent [19]

Shimizu et al.

[11] Patent Number: 4,724,469
[45] Date of Patent: Feb. 9, 1988

[54] IMAGE RECORDING APPARATUS

[75] Inventors: Masayuki Shimizu; Minoru Saito, both of Kanagawa, Japan

[73] Assignee: Fuji Photo Film Co., Ltd., Kanagawa, Japan

[21] Appl. No.: 25,697

[22] Filed: Mar. 13, 1987

[30] Foreign Application Priority Data

Mar. 14, 1986 [JP] Japan .................................. 61-056703

[51] Int. Cl.⁴ ............................................ G03B 27/30
[52] U.S. Cl. ................................................... 355/107
[58] Field of Search ............... 430/203; 355/100, 106, 355/107

[56] References Cited

U.S. PATENT DOCUMENTS

| | | | |
|---|---|---|---|
| 3,551,049 | 12/1970 | Limberger et al. | 355/107 |
| 3,685,908 | 8/1972 | O'Mara | 355/107 |
| 3,749,491 | 7/1973 | Maxfield et al. | 355/106 |
| 4,624,560 | 11/1986 | Beery | 355/100 |
| 4,626,099 | 12/1986 | Zuelke et al. | 355/100 X |

Primary Examiner—Richard A. Wintercorn
Attorney, Agent, or Firm—Sughrue, Mion, Zinn, Macpeak & Seas

[57] ABSTRACT

Disclosed is an image recording apparatus for allowing an image to be formed on an image receiving material by heat-developing and transferring an image recorded on a heat-developable light-sensitive photographic material onto an image receiving material in the presence of an image forming solvent. The heat-developable light-sensitive material is exposed while it is being wound around a rotating exposure drum, the exposed heat-developable light-sensitive material is applied with an image forming solvent while it is still wound on the drum. In consequence, the amount of space required for solvent application can be reduced.

20 Claims, 6 Drawing Figures

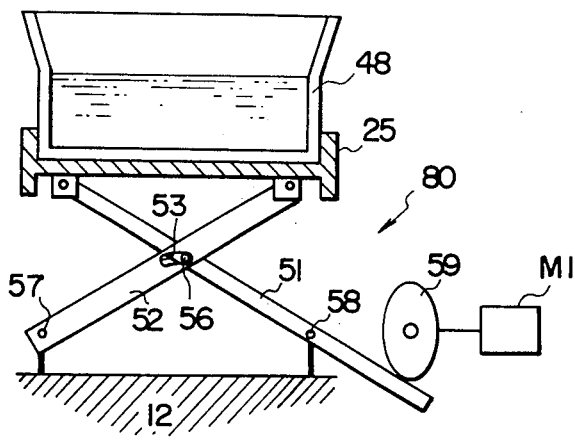
FIG. 4
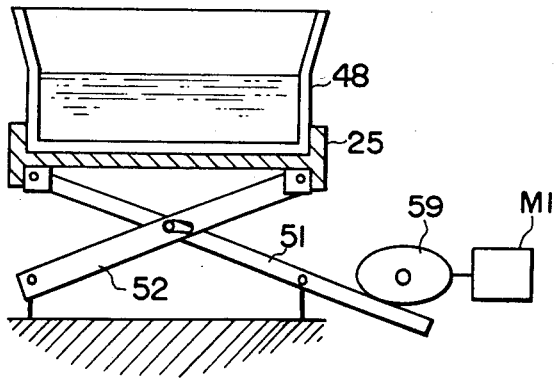

IMAGE RECORDING APPARATUS

BACKGROUND OF THE INVENTION

The present invention relates to an image recording apparatus which allows an image to be formed on an image receiving material by transferring an image recorded on a heat-developable light-sensitive photographic material onto the image receiving material in the presence of an image forming solvent.

DESCRIPTION OF THE RELATED ART

Image recording apparatuses which employ a heat-developable light-sensitive photographic material to obtain color images have heretofore been known, one example thereof being described in, for example, the specification of Japanese Patent Laid-Open No. 75247/1984. In these apparatuses, a heat-developable light-sensitive material is image exposed in the exposing section and then fed to a heat-developing section, after which the heat-developed light-sensitive material is brought into tight contact with an image receiving paper onto which the image is transferred by means of a transfer process.

In the apparatuses described above, the image receiving paper generally has a transfer assistant (an image forming solvent) such as water applied to it before it is fed to the transfer section in order to improve transfer efficiency.

This water application is performed by means of a roller impregnated with water in the apparatus described in Japanese Patent Laid-Open No. 75247/1984. This method therefore requires a certain space for application of water. Further, water must be applied to the image receiving paper while it is being conveyed, and this causes uneven application of water to occur which would lead to non-uniform transfer.

An apparatus in which water is applied to an image receiving paper by passing it through a water tank before it is fed to a transfer section has been proposed. In this method, water is applied to the image receiving paper on the back surface thereof, and this makes the paper curl. A large amount of heat is also required during heat transfer.

SUMMARY OF THE INVENTION

The present invention is directed to an image recording apparatus which allows an image to be formed on an image receiving material by transferring an image recorded on a heat-developable light-sensitive material thereto in the presence of an image forming solvent, and comprises an exposure drum for image exposing the heat-developable light-sensitive material, and coating means mounted adjacent to the exposure drum for applying the image forming solvent to the heat-developable photosensitive material wound thereon.

According to the present invention, it is possible to reduce the amount of space exclusively used for accommodating the coating means since it is provided adjacent to the exposure drum. Further, an image forming solvent is applied by means of the coating means to the heat-developable photosensitive material which is wound on the exposure drum while the drum is being rotated, that is, it is applied to the heat-developable photosensitive material fixed on the exposure drum, and stable and uniform coating is therefore enabled.

The image forming solvent coating means employed in the present invention may be one of the type which employs a coating roller as described in Japanese Patent Laid-Open No. 75247/1984 issued in the name of present applicant, one of the type in which the image forming solvent is sprayed onto the paper as described in Japanese Patent Application No. 158547/1985, one of the type in which a water absorbing coating member is made to come into contact with or become separated from the paper as described in Japanese Patent Application No. 168411/1985, or one of the type which employs an endless belt with a solvent coating portion formed thereon as described in Japanese Utility Model Application No. 189752/1985.

In the image recording apparatus of the present invention, it is possible to separately provide a heat-developing section in which the exposed heat-developable light-sensitive material is heat developed and a transfer section in which the heat-developed light-sensitive material is brought into close contact with the image receiving material, and both being heated to transfer the image onto the image receiving material. Alternatively, they may be combined together, that is, a heat-developing/transferring section may be provided in which the exposed heat-developed sensitive material and the image receiving material are brought into close contact heat-development and heat transfer are performed simultaneously.

The image recording apparatus of the present invention may employ a heat-developable light-sensitive material (a heat-developable light-sensitive element) and an image receiving material (color fixing element) of the types described in, for example, the specifications of U.S. Pat. Nos. 4,430,415, 4,483,914, 4,500,626, 4,503,137, Japanese Patent Laid-Open Nos. 154, 445/1984, 165, 054, 180, 548/1984, 218, 443/1984, 120, 356/1985, 209, 563/1984, Japanese Patent Application Nos. 79, 709/1985, 169, 585/1985, and Japanese Patent Application No. 144, 873/1985.

The image forming solvent employed in this invention is required for forming an image, and it may be water, organic solvent having a low boiling point (such as alcohol, keton, amide), or a solvent of any of these to which various additives such as surface-active agent, accelerator and development terminator have been added.

BRIEF DESCRIPTION OF THE DRAWINGS

FIGS. 3 and 4 illustrate the vertical operation of a moving table; and

DETAILED DESCRIPTION OF THE INVENTION

Figure 1:
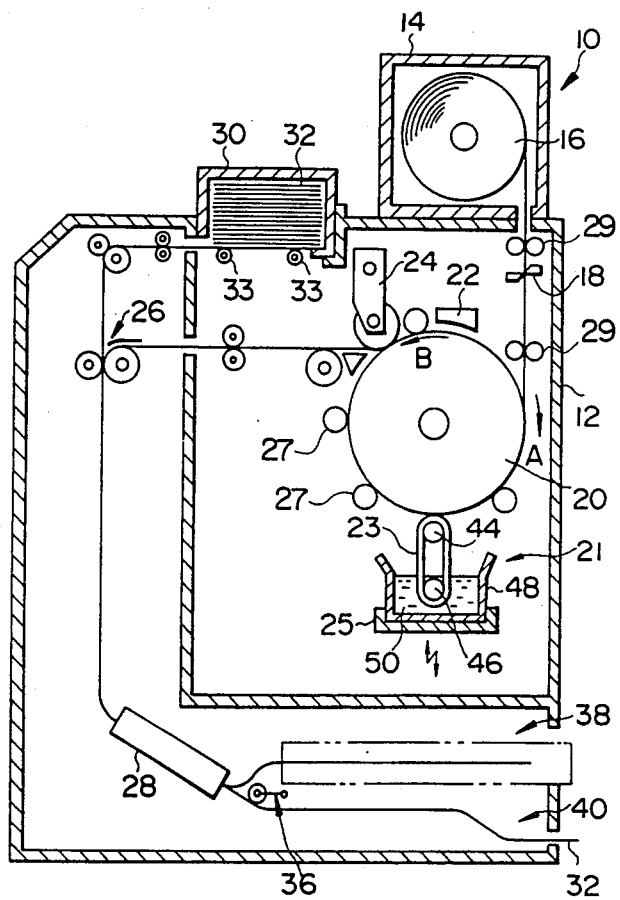
FIG. 1 is a longitudinal cross-sectional view of an embodiment of an image recording apparatus according to the present invention.

An embodiment of an image recording apparatus according to the present invention which allows for heat-development and heat transfer simultaneously will be hereinunder described by referring to the accompanying drawings.

An image recording apparatus generally designated by reference numeral 10 has a magazine 14 mounted on a casing 12 for containing a heat-developable light-sensitive material 16. An exposure drum 20 is rotatably disposed below the magazine 14, and rollers 27 are mounted in such a manner as to make contact with the exposure drum 20. Between the magazine and the exposure drum are a cutter 18 and a pair of conveying rollers 29.

After the light-sensitive material 16 is drawn from the magazine 14 and cut into predetermined lengths by the cutter 18, it is conveyed in the direction shown by an arrow A to and wound on the outer periphery of the exposure drum 20 incorporated in the casing, and is exposed by an exposing head 22. Thereafter, it is conveyed in the opposite direction on the drum (in the direction shown by an arrow B), and is coated by coating means 21 with water which serves as an image forming solvent. It is then scraped from the drum by a scraper 24 driven by a motor M2 and is fed to a contacting section 26.

Pieces of image receiving paper 32 which act as an image receiving material are overlappingly cased in a cassette 30, and are fed to the contacting section 26 by conveying rollers 33 one by one from the bottom so that they are brought into close contact with the light-sensitive material 16 before they are fed to a heat-development/heat transfer section 28. A scraping section 36 is provided beyond the heat-development/heat transfer section 28, from which the light-sensitive material 1 is sent to a collecting device 38 while a piece of the image receiving paper 32 is fed to a port 40.

The coating means 21 comprises a moving table 25 which is moved back and forth in the direction in which it is directed to the axis of the exposing drum 20, a tank 48 mounted on the moving table 25, a roller 46 immersed in the water 50 contained in the tank 48, a roller 44 mounted outside the tank 48 and driven by a motor M3, and a coating member 23 of an endless belt which is wound around the rollers 44, 46. The coating member 23 is rotated by the rotation of the roller 44 driven by the motor M3. The coating member 23 may be formed of a water absorbing material. It may also be one which has an irregular surface. The apparatus of this embodiment employs the pair of rollers 44, 46 and the endless belt 23 engaged thereto. However, they may be replaced with at least one roller (not shown) disposed in such a manner that a portion thereof is immersed in the water contained in the tank and the opposite portion is located adjacent to the exposing drum 20.

Means 80 for moving the moving table 25 will be described in detail below.

Figure 2:
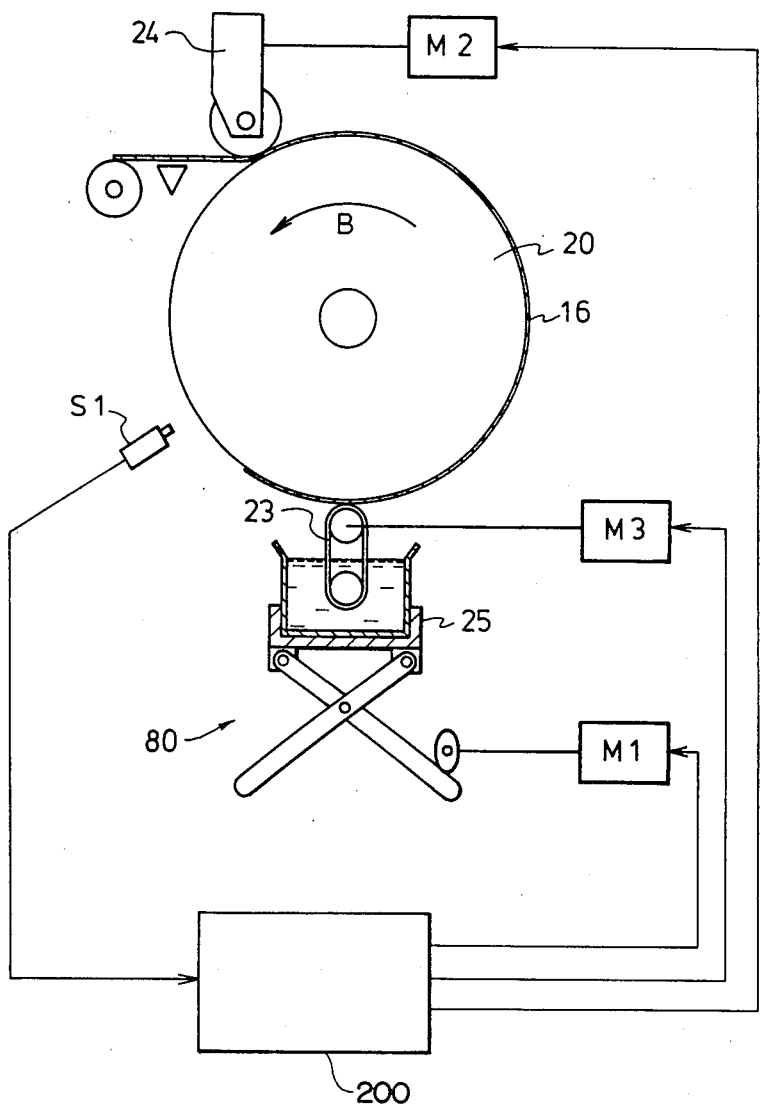
FIG. 2 schematically illustrates the deposition of an exposure drum, a tank and a control circuit.

As shown in FIG. 2, the moving means 80 is a pantograph type mechanism which includes leg members 51, 52 disposed in a crisscross arrangement on the underside of the moving table 25, an elliptical cam 59 disposed in such a manner that it abuts against one end (the lowest end) of the leg member 51, and a motor M1 for rotating the cam 59. The moving table 25 is lowered and raised by the rotation of the cam 59.

More specifically, the leg member 51 has a pin 56 secured to the center thereof, while the leg member 52 has a slit 53 into which the pin 56 is received in such a manner as to be slidable therein, as shown in FIGS. 3 and 4. The lower end of the leg member 52 is pivotally supported on the casing 12 by means of a pin 57. The leg member 51 is pivotally supported on the casing 12 by means of pin 58 in the same manner as in the leg member 52, and the lowest end thereof which is extended further abuts against the elliptical cam 59. The upper ends of the leg members 51, 52 abut against the underside of the moving table 25, and can come closer and be separated from each other. In consequence, when the cam 59 is rotated by the motor M1 from the state shown in FIG. 3 to the state shown in FIG. 4, the leg members 51, 52 are respectively pivotted about the pins 58, 57, while the upper ends thereof are moved away from each other, by which means the moving table 25 is lowered. Similarly, when the motor M1 is rotated starting from the state shown in FIG. 4, the upper ends of the leg members 51, 21 are moved toward each other, by which means the moving table 25 is raised.

As described above, the moving table 25 is moved back and forth in the vertical direction in this embodiment by means of an elevating mechanism which comprises two leg members disposed in a crisscross arrangement. However, this movement may be provided using a mechanism (not shown) comprising an assembly of four or more alternately crossing leg members. Such a mechanism may also be driven, in place of the elliptical cam, by a pressing rod which is moved back and forth by means of a hydraulic or pneumatic cylinder and which is disposed in such a manner as to abut against the lower end of the lowest leg member. Further, the moving table may be raised and lowered by providing a reciprocatively movable cylinder on the underside thereof in lieu of these elevating mechanisms which employ leg members.

As shown in FIG. 2, a photosensor S1 is disposed adjacent to the outer periphery of the exposure drum 20. The signal from the photosensor S1 is input to a control circuit 200 which serves as a control means for controlling the drive of the motors M1, M2, M3.

The photosensor S1 is of the reflection type. Since the outer periphery of the exposure drum is dull black in color, the photosensor S1 is off when the light-sensitive material 16 is not present thereon. It is turned on when light shines on the light-sensitive material 16 wound on the exposure drum 20. The control means 200 has stored in it the program of a control routine to be described later.

Figure 5A:
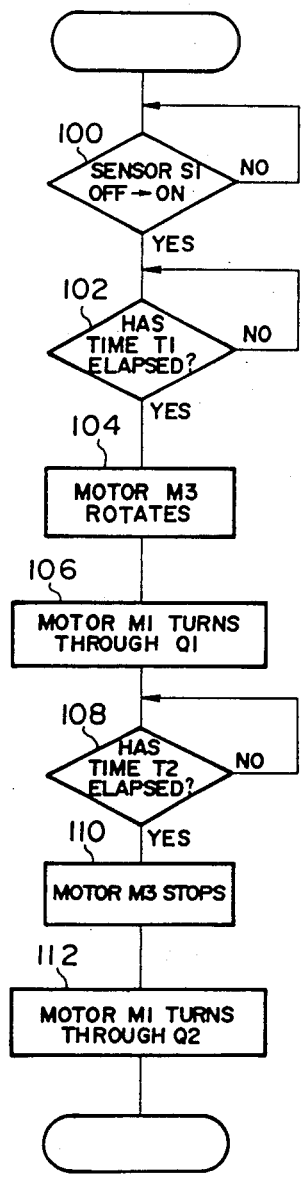
FIGS. 5A and 5B are flow charts for the water coating operation.
Figure 5B:
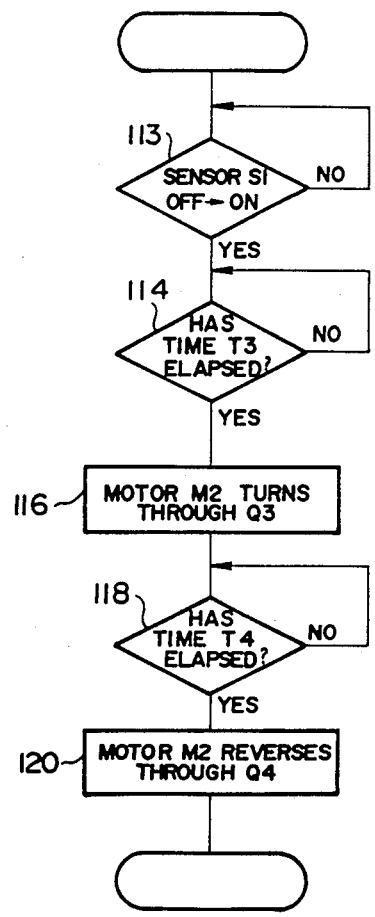

Control of the motors M1, M2, M3 will be described below by referring to FIGS. 5A and 5B.

The light-sensitive material 16 which is fed from the magazine 14 is cut into pretermined lengths by the cutter 18, and the cut material piece is fed to the outer periphery of the exposure drum 20. The rotational speed of the exposure drum 20 (in the directions A and B) is set at a predetermined value.

In Step 100, judgement is made as to whether or not the sensor S1 is turned on, by which means it is judged whether or not the forward end of the light-sensitive material 16 has reached the sensor while it is being wound around the exposure drum 20. The light-sensitive material 16 is then further rotated in the direction A so that it is exposed by the exposure head 22. Thereafter, the exposure drum 20 is rotated in the direction B. If the result of the judgement of Step 100 is affirmative, it is then judged in Step 102 whether or not a predetermined time T1 (the time from the turning on of the sensor S1 to the start of water application) has elapsed. If the answer is Yes, the motor M3 is rotated in Step 104 so as to rotate the coating member 23. While the motor M3 is being rotated, the motor M1 is rotated through a predetermined angle Q1 (with the cam 59 being rotated a quarter revolution from the state shown in FIG. 4) in Step 106 so as to raise the moving table 25 and thereby apply water 50 to the light-sensitive material 16. Thereafter, judgement is made in Step 108 as to whether or not a predetermined time T3 (the time from the start of the application of water 50 to the finish thereof) has elapsed. If the result is Yes, the rotation of the motor M3 is stopped in Step 110, and the motor M1 is rotated through a predetermined angle Q2 in Step 112 so as to lower the moving table, thereby completing the water application. At this time, Q1 is equal to Q2.

In Step 113, it is determined whether or not the sensor S1 is turned on. If the answer is Yes, it is then judged in Step 114 whether or not a predetermined time T3 (the time from the detection of the light-sensitive material 16 to the start of the scraping operation) has elapsed. If the result of the judgement is Yes, the motor M2 is rotated through a predetermined angle Q3 in Step 116 so as to locate the scraper 24 at a position at which it will scrape off the light-sensitive material 16. Thereafter, judgement is made in Step 118 as to whether or not a predetermined time T4 (the time from the start of scraping off the light-sensitive material 16 to the completion thereof) has elasped. If the result is Yes, the motor M2 is reversed through a predetermined angle Q4 in Step 120 so as to return the scraper 24 to its original position. At this time Q1 is equal to Q2.

Operation of the image recording apparatus of this embodiment will be described below.

The heat-developable light-sensitive material 16 taken from the magazine 14 is wound around the exposure drum 20 (in the direction of the arrow A), and exposed by the exposure head 22. The exposure drum 20 with the light-sensitive material 16 wound thereon is then rotated in the direction of the arrow B, and the moving table 25 is brought closer to the exposure drum 20 while the coating member 23 is rotated by the drive of the rollers 44, 46, so that the water 50 contained in the tank 48 is applied to the exposed surface of the heat-developable light-sensitive material 16. The exposure drum is further rotated in the direction of the arrow B, and the light-sensitive material is scraped off the outer periphery of the exposure drum 20 by the scraper 24 and fed to the contacting section 26.

In the meantime, the piece of paper lying at the bottom of the stack of image receiving paper 32 accommodated in the cassette 30 is fed to the contacting section 26 by means of the conveying rollers 33.

The heat-developable light-sensitive material 16 and the piece of paper 32 which have been brought into close contact with each other in the contacting section 26 are then fed to the heat-development/transfer section 28 where heat-development and heat-transfer of the resulting color image onto the photographic emulsion deposited on the piece of image receiving paper 32 are performed simultaneously in the presence of water. In this transfer operation, since a suitable amount of water has already been applied to the heat-developable light-sensitive material 16, an excellent transfer operation is enabled.

The light-sensitive material 16 and the piece of image receiving paper 32 which are still closely in contact upon the completion of the transfer operation are then fed to the scraping section 36 where they are separated from each other, the light-sensitive material 16 being accommodated in the collecting device 38 and the piece of image receiving paper 32 being fed to the port 40 thereafter.

What is claimed is:

1. An image recording apparatus which allows an image to be formed on an image receiving material by transferring an image recorded on a heat-developable light-sensitive photographic material thereto in the presence of an image forming solvent, comprising:
    an exposure drum having an outer periphery around which said heat-developable light-sensitive material is wound;
    an exposure head disposed adjacent to the outer periphery of said exposure drum for exposing the heat-developable light-sensitive material wound therearound; and
    coating means for applying said image forming solvent to the exposed heat-developable light-sensitive material while it is being wound around said exposure drum.

2. An image recording apparatus according to claim 1, further including elevating means for causing said coating means to come into contact with and become separated from said heat-developable light-sensitive material.

3. An image recording apparatus according to claim 2, further including scraping means for scraping said light-sensitive material off said exposure drum after the application of said solvent is completed.

4. An image recording apparatus according to claim 3, further including a sensor for detecting if the light-sensitive material has been wound around the exposure drum, and control means for controlling said coating means, said elevating means and said scraping means on the basis of the signals sent from said sensor.

5. An image recording apparatus according to claim 4, wherein said coating means includes a moving table, a tank disposed on said moving table and containing the image forming solvent, and a coating member for coating said solvent onto the light-sensitive material on being rotated by the operation of a first driving means.

6. An image recording apparatus according to claim 5, wherein said elevating means includes leg members disposed on the underside of said moving table and arranged in crossing relation with each other, a second driving means, and a cam member disposed in such a manner as to abut against one of said leg members, said cam member pivotting said leg members about the portions thereof which cross each other on being rotated by the operation of said second driving means and thereby raising and lowering said moving table.

7. An image recording apparatus according to claim 6, wherein said scraping means includes a third driving means, and a scraper that is located at a position at which it is caused to scrape off the light-sensitive material by means of the operation of said third driving means.

8. An image recording apparatus according to claim 7, wherein said control means is adapted, in accordance with the signals sent from said sensor, to operate said first driving means so as to rotate said coating member, operate said second driving means so as to raise said moving table and thereby apply said solvent to the light-sensitive material, and operate said third driving means so as to locate said scraper at a position at which it may scrape off the light-sensitive material and thereby scrape off the light-sensitive material.

9. An image recording apparatus according to claim 8, wherein said coating member has a pair of rollers, one of said rollers being disposed in such a manner that it can be immersed in said solvent, and an endless belt wound around said pair of rollers and having a portion immersed in said solvent.

10. An image recording apparatus which allows an image to be formed on an image receiving material by transferring an image recorded on a heat-developable light-sensitive photographic material thereto in the presence of an image forming solvent, comprising:

an exposure drum having an outer periphery around which said light-sensitive material is to be wound;

an exposure head disposed adjacent to the outer periphery of said exposure drum and exposing the light-sensitive material wound therearound;

coating means disposed in such a manner that it can be brought into contact with or separated from said exposure drum and made to apply said image forming solvent to the exposed light-sensitive material while it is being wound around said exposure drum;

scraping means for scraping said light-sensitive material off said exposure drum after the application of said solvent has been completed; and heat-developement/heat transfer means for allowing heat-development/transfer to be performed on the closely contacted light-sensitive material and the image receiving material.

11. An image recording apparatus according to claim 10, further including elevating means for bringing said coating means into contact with and separating it from said light-sensitive material.

12. An image recording apparatus according to claim 11, further including a sensor for detecting if the light-sensitive material has been wound around the exposure drum, and control means for controlling said coating means, said elevating means and said scraping means on the basis of the signals sent from said sensor.

13. An image recording apparatus according to claim 12, wherein said coating means includes a moving table, a tank disposed on said moving table and containing the image forming solvent, and a coating member supported on said moving table for coating said solvent onto the light-sensitive material on being rotated by a first motor.

14. An image recording apparatus according to claim 13, wherein said elevating means includes leg members disposed on the underside of said moving table and arranged in crossing relation with each other, a second driving motor, and a cam disposed in such a manner as to abut against one of said leg members, said cam pivoting said leg members about the portions thereof which cross each other on being rotated by the rotation of said second motor and thereby raising and lowering said moving table.

15. An image recording apparatus according to claim 14, wherein said scraping means includes a third motor, and a scraper that is moved to a position at which it is caused to scrape off the light-sensitive material on being operated by said third motor.

16. An image recording apparatus according to claim 15, wherein said control means is adapted, in accordance with the signals sent from said sensor, to rotate said first motor so as to rotate said coating member, rotate said second motor so as to raise said moving table and thereby apply said solvent to the light-sensitive material, and operate said third motor so as to move said scraper to a position at which it will scrape off the light-sensitive material and thereby perform scraping.

17. An image recording apparatus according to claim 16, wherein said coating member has a pair of rollers disposed in such a manner that they are immersed in said solvent, and an endless belt wound around said pair of rollers and having a portion immersed in said solvent.

18. An image recording apparatus which allows an image to be formed on an image receiving material by transferring an image recorded on a heat-developable light-sensitive photographic material thereto in the presence of an image forming solvent, comprising:

a casing;

a magasine mounted on said casing for accommodating said light-sensitive material;

a cutter for cutting the light-sensitive material drawn from said magazine into predetermined lengths;

an exposure drum having an outer periphery around which the cut light-sensitive material is wound;

an exposure head disposed adjacent to the outer periphery of said exposure drum for exposing the light-sensitive material wound therearound;

coating means for applying said image forming solvent to the exposed light-sensitive material while it is being wound around said exposure drum;

scraping means for scraping the solvent coated light-sensitive material off the exposure drum;

contacting means for bringing the scraped light-sensitive material into close contact with the image receiving material; and heat-developement/heat transfer means for allowing heat-development/transfer to be performed on the closely contacted light-sensitive material and the image receiving material.

19. An image recording apparatus according to claim 18, further including a reflection type sensor for detecting if the light-sensitive material has been wound around the exposure drum, and control means for controlling said coating means, said elevating means and said scraping means on the basis of the signals sent from said sensor.

20. An image recording apparatus according to claim 19, wherein said coating means includes a moving table disposed in such a manner that it is made to come into contact with said exposure drum, a tank mounted on said moving table and containing said solvent, and a coating member supported by said moving table for applying said solvent to the light-sensitive material.

* * * * *